US011501307B1

(12) United States Patent
Jonak et al.

(10) Patent No.: US 11,501,307 B1
(45) Date of Patent: Nov. 15, 2022

(54) AUTHORIZATION SYSTEMS BASED ON PROTECTED DATA

(71) Applicant: UIPCO, LLC, San Antonio, TX (US)

(72) Inventors: Sumita T. Jonak, San Antonio, TX (US); Pooja Krishnaswamy, Cedar Park, TX (US); Christopher Russell, San Antonio, TX (US); Gabriel Carlos Fernandez, San Antonio, TX (US); Joel S. Hartshorn, Olalla, WA (US); Thomas Wayne Schwarz, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/077,001

(22) Filed: Oct. 22, 2020

Related U.S. Application Data

(60) Provisional application No. 62/928,621, filed on Oct. 31, 2019.

(51) Int. Cl.
*G06Q 20/20* (2012.01)
*G06Q 20/34* (2012.01)
*G06Q 20/40* (2012.01)

(52) U.S. Cl.
CPC .......... *G06Q 20/405* (2013.01); *G06Q 20/20* (2013.01); *G06Q 20/341* (2013.01); *G06Q 20/4018* (2013.01)

(58) Field of Classification Search
CPC combination set(s) only.
See application file for complete search history.

(56) References Cited

U.S. PATENT DOCUMENTS

| 2008/0189186 A1* | 8/2008 | Choi ................ G06Q 20/322 |
| | | 705/26.35 |
| 2017/0163617 A1* | 6/2017 | Laxminarayanan ....................... |
| | | G06Q 20/4018 |

OTHER PUBLICATIONS

A Guide to EMV Chip Technology, version 2.0, Nov. 2014, https://www.emvco.com/wp-content/uploads/2017/05/A_Guide_to_EMV_Chip_Technology_v2.0_20141120122132753.pdf "EMV" (Year: 2014).*

* cited by examiner

*Primary Examiner* — Peter Ludwig
*Assistant Examiner* — Reva R Moore
(74) *Attorney, Agent, or Firm* — Perkins Coie LLP

(57) ABSTRACT

The disclosure describes techniques to protect personal information stored on an electronic card with which an owner of the electronic card may be authorized to perform a transaction. For example, a point-of-sale (POS) device may receive protected data generated by an electronic card where the protected data may be used by a personal information server to identify the owner of the electronic card. The POS devices sends the protected data and transaction information to an authorization server that sends the protected data to a personal information server. The owner's personal information can be obtained or derived from the protected data by the personal information server and the personal information is sent to the authorization server. The authorization server can determine whether a transaction is authorized or unauthorized based on the transaction information obtained from the POS device and the personal information obtained from the personal information server.

23 Claims, 6 Drawing Sheets

AUTHORIZATION SYSTEMS BASED ON PROTECTED DATA

CROSS-REFERENCE TO RELATED APPLICATIONS

This application is a non-provisional of and claims priority to U.S. Provisional Application No. 62/928,621, filed on Oct. 31, 2019, entitled "AUTHORIZATION SYSTEMS BASED ON PROTECTED DATA," which is hereby incorporated by reference in its entirety for all purposes.

BACKGROUND

Shopping at a physical retail store involves a familiar process. A consumer first obtains one or more items from the retail store, and then the consumer stands in a checkout line to purchase the one or more items. Often, the consumer pays for the one or more items using a physical credit card or a digital credit card stored on the consumer's mobile device.

Figure 1:
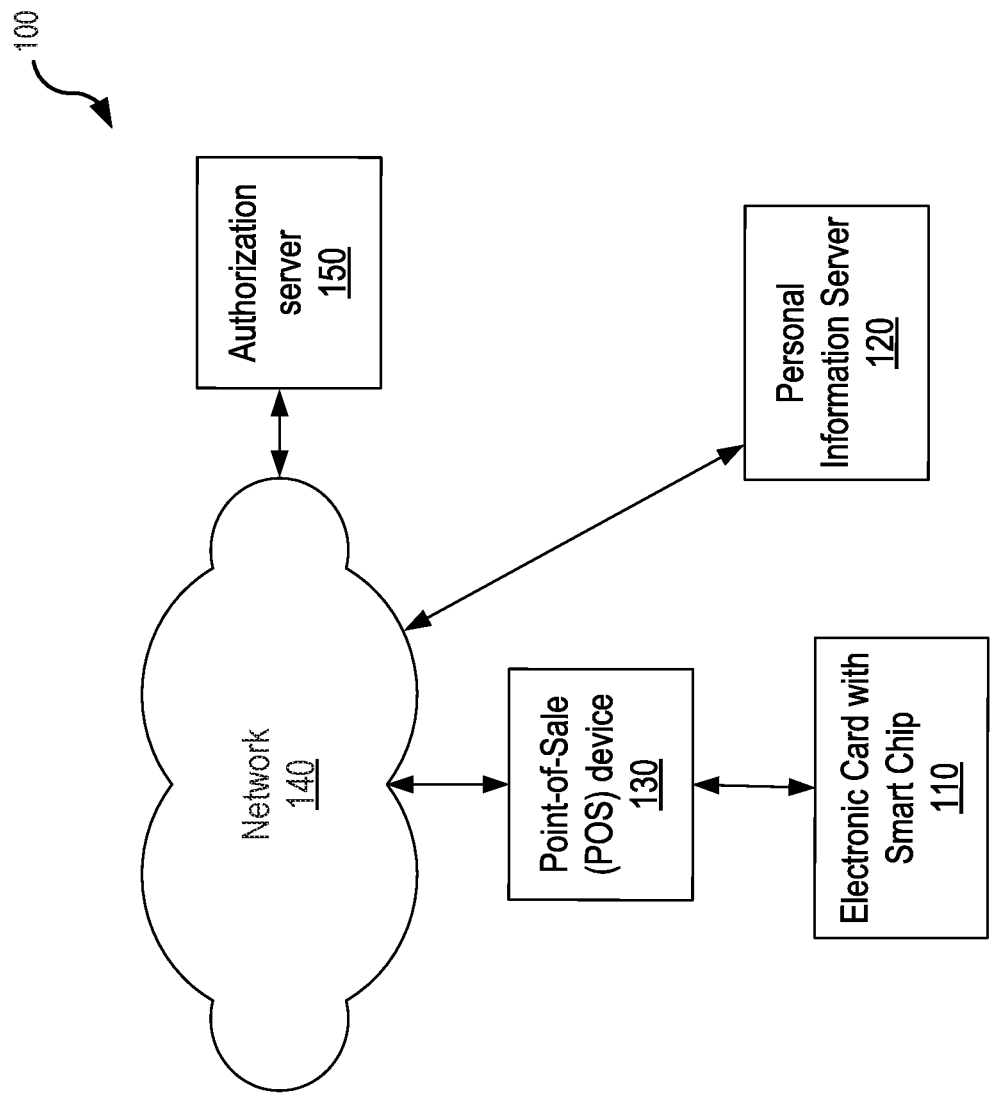
FIG. 1 shows an example of an operating environment for an authorization system that authorizes transaction based on protected data.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Point of sale (POS) devices present security issues at least because a person may be able to hack a POS device to obtain sensitive electronic card related information provided to the POS device. To overcome at least this technical problem, among others, the embodiments of the present disclosure generally relate to systems and methods to authorize a user's transaction based on an electronic card providing protected data (e.g., a random or encrypted card number) to a POS device. The electronic card may generate the protected data that may be used by a personal information server to identify personal information (e.g., true card number, account number and/or owner of the electronic card). For example, the POS device sends the protected data and transaction information (e.g., amount of purchase) to an authorization server that sends the protected data to a personal information server. The owner's personal information can be obtained or derived from the protected data by the personal information server and the personal information can be returned to the authorization server. The authorization server can determine whether a transaction is authorized or unauthorized based on the transaction information obtained from the POS device and the personal information obtained from the personal information server. In some implementations, the authorization server determines the identity of the owner without requesting information from the personal information server (i.e., the authorization server is also the personal information server).

FIG. 1 shows an example of an operating environment for an authorization system 100 that authorizes transaction based on protected data. An overview of the authorization system 100 is first presented below, followed by a detailed presentation of the operations performed by the various systems and devices of the authorization system 100. The authorization system 100 includes at least the following three devices or servers that collect and/or analyze protected data provided by an electronic card 110 belonging to a person: (1) a POS device 130, (2) a personal information server 120, and (3) an authorization server 150. The electronic card 110 may include a smart chip that may have contact interfaces or may be contactless.

When an electronic card 110 is inserted into or placed next to (e.g., within 2 inches) of the POS device 130, the POS device 130 can obtain protected data from the electronic card 110 to initiate a transaction. The POS device 130 sends the protected data and the purchase price of a transaction to purchase one or more items to the authorization server 150 that may send the protected data to the personal information server 120 to be further processed. The personal information server 120 can, based on the provided protected data, obtain personal information (e.g., name, credit card number, account number, etc.) about the owner of the electronic card 110. The personal information server 120 sends the personal information to the authorization server 150 so that the authorization server can, based on the personal information and the purchase price of the transaction determine either to authorize or to unauthorize the transaction.

Figure 2:
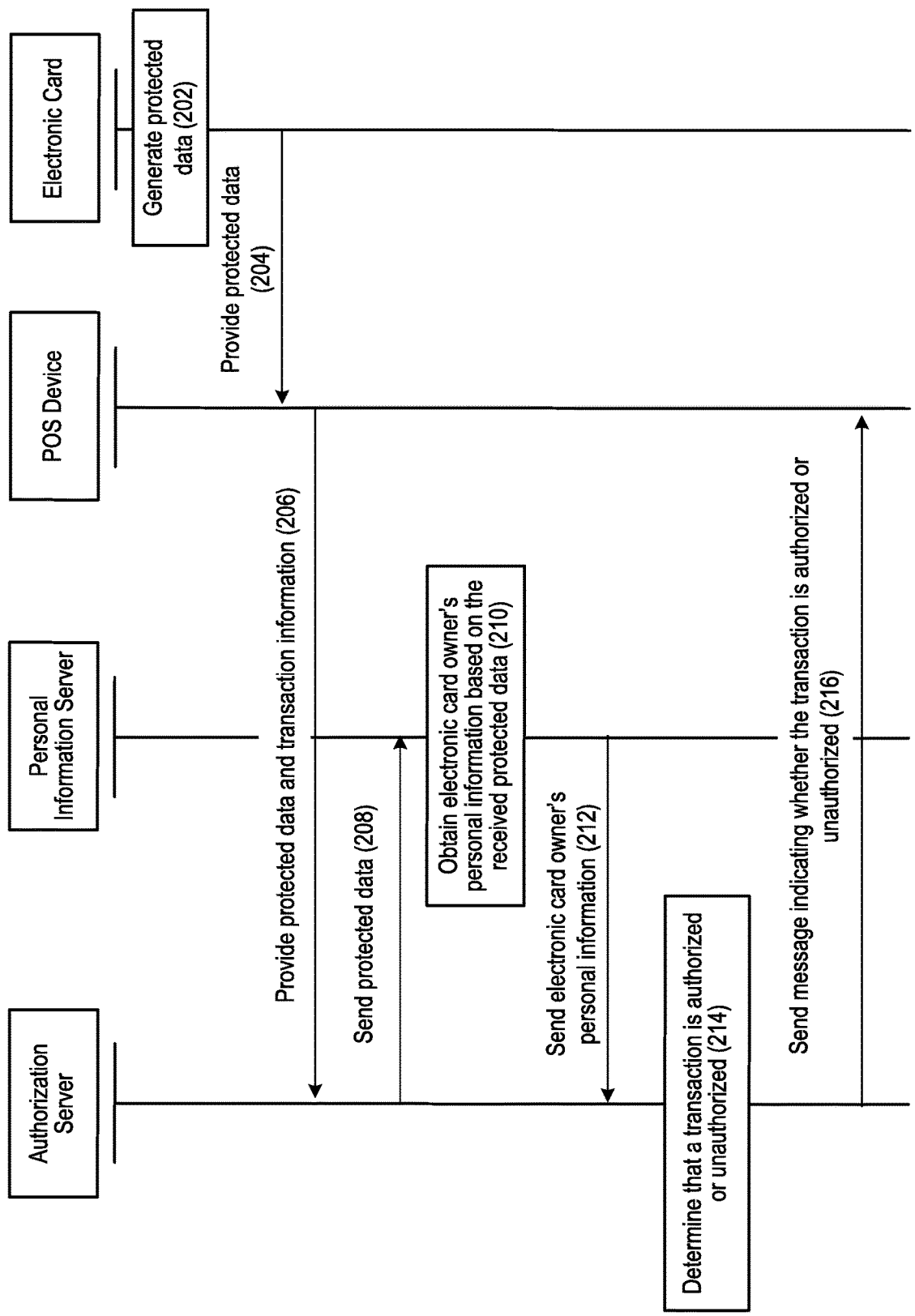
FIG. 2 shows an example process performed by an authorization system based on protected data provided by an electronic card to a point-of-sale (POS) device.

FIG. 2 shows an example process performed by an authorization system based on protected data provided by an electronic card to a POS device. At operation 202, the smart chip on the electronic card can generate protected data in response to receiving power from the POS device. As mentioned above, the electronic card can be inserted into the POS device or can be located near the POS device to receive power.

When the smart chip receives power, the smart chip can generate protected data based on a pre-determined value known to the electronic card and on a first value. In one example, the pre-determined value may include an encryption key stored in the smart chip so that the smart chip can encrypt a first value stored in the smart chip to obtain an encrypted value. The first value is not a credit card number or sensitive personal information (e.g., bank account number) but may be related to a bank account or credit card number associated with the owner of the electronic card. The protected data may be generated such that as least some of the values of the protected data may enable the personal information server to identify the decryption key that is to be used to obtain the electronic card owner's personal information at operation 210 as further explained below.

The first value may be a randomly generated value known to the personal information server so that when a protected data is derived from the first value, the personal information module (shown as 540 in FIG. 5) of the personal information server can obtain the first value from the protected data and then obtain the electronic card owners' personal information (e.g., account number, name, credit card number, etc.) associated with the first value as further described in operation 210. A technical benefit of having the first value being randomly generated is that the owner's personal information is not disclosed to an unauthorized person (e.g., hacker or thief) if the electronic card or the contents of the electronic card are stolen. After the electronic card generates the protected data, the electronic card provides the protected data to the POS device at operation 204. In this patent document, information or data that is "known to" an electronic card and/or personal information server may include information or data that is stored on the electronic card and/or personal information server.

At operation 206, the POS device provides the protected data and transaction information to the authorization server. The transaction information may include a purchase price of a transaction to purchase one or more items by the owner of the electronic card. The authorization module (shown as 440 in FIG. 4) of the authorization server receives the protected data and the transaction information. At operation 208, the authorization module (shown as 440 in FIG. 4) of the authorization server sends the protected data 208 to the personal information server so that the personal information module of the personal information server can obtain the owner's personal information based on the protected data.

At operation 210, the personal information module of the personal information server can obtain the electronic card owner's personal information (e.g., account number, name, credit card number, etc.) based on the protected data. In one example, the personal information server may store a decryption key associated with the encryption key with which the electronic card generated the protected data at operation 202. The personal information module may identify the decryption key based on certain values included in the protected data. At operation 212, the personal information module of the personal information server sends the obtained personal information of the electronic card owner to the authorization server.

At operation 214, the authorization module of the authorization server receives the electronic card owner's personal information and determines whether a transaction is authorized or unauthorized. The authorization module can determine that the transaction is authorized by determining that the personal information is previously stored on a database associated with the authorization server, and by determining that the purchase price is less than or equal to a stored purchase price limit associated with the personal information. The authorization module can also determine that the transaction is unauthorized by determining either that the personal information is not previously stored on a database associated with the authorization server or that the purchase price is greater than a stored purchase price limit associated with the personal information. In response to the outcome of operation 214, at operation 216, the authorization module may send a message to the POS device indicating that the transaction is either authorized or unauthorized.

In some embodiments, the smart chip of the electronic card may select the pre-determined value in an order from a list of pre-determined values stored in the smart chip. The order of selection and the list of pre-determined mathematical values may be known to and/or stored in the personal information server. The order of selection may be a sequential order or may be an out-of-sequence order. In some embodiments, the smart chip of the electronic card can be configured to select the pre-determined value for each transaction for which the electronic card is used. For example, every time the electronic card is presented to the POS device, the smart chip can select the pre-determined value from the list of pre-determined values and then generate the protected data from a first value stored in the smart chip.

In some embodiments, a same server may be configured to perform the operations of the personal information module and the authorization module. In such embodiments, the POS device may send the personal data and the transaction information to one server that can determine an electronic card owner's personal information based on the protected data and can determine whether a transaction is authorized or unauthorized based on the techniques described in this patent document. Thus, for example, the personal information server and the authorization server may be the same server in some embodiments.

Figure 3:
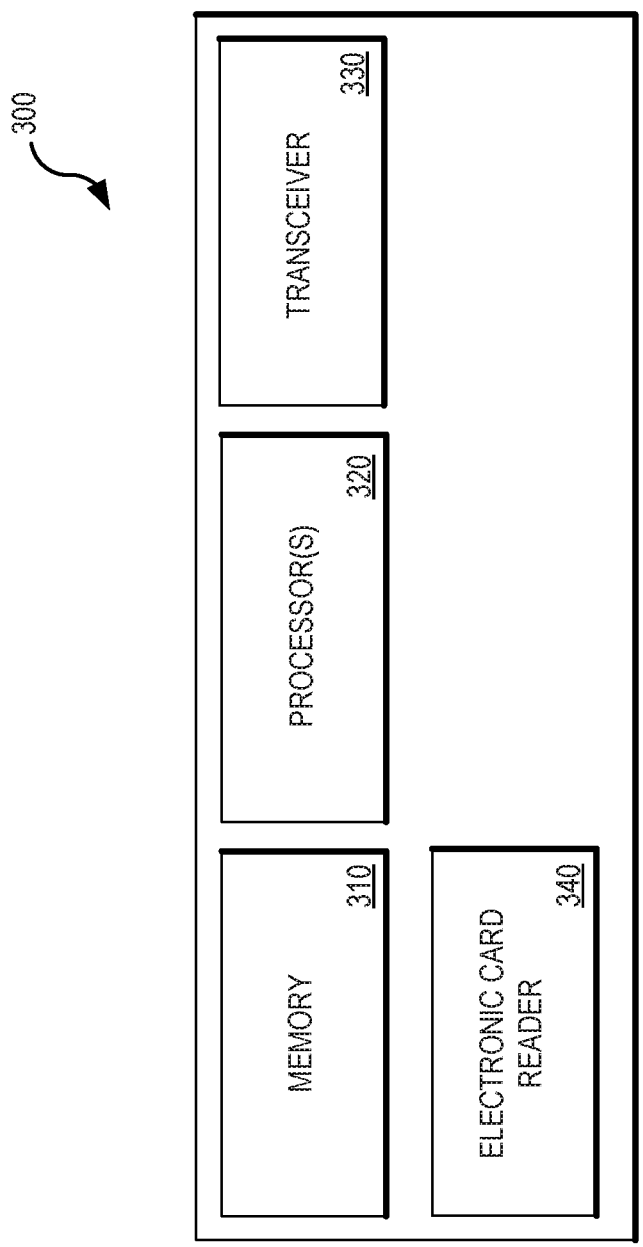
FIG. 3 shows a block diagram of a POS device.

FIG. 3 shows a block diagram of a POS device. The POS device 300 includes at least one processor 320 and a memory 310 having instructions stored thereupon. The instructions upon execution by the processor 320 can configure the POS device 300 to scan or obtain protected data from an electronic card via the electronic card reader 340. In an example implementation, the electronic card reader 340 may include a receptacle through which the electronic card reader may be inserted so that the electronic card reader may provide power to a smart chip on or in the electronic card and so that the electronic card reader may obtain protected data from the smart chip. In another example implementation, the electronic card reader 340 may wirelessly power and receive protected data from the smart chip.

Figure 4:
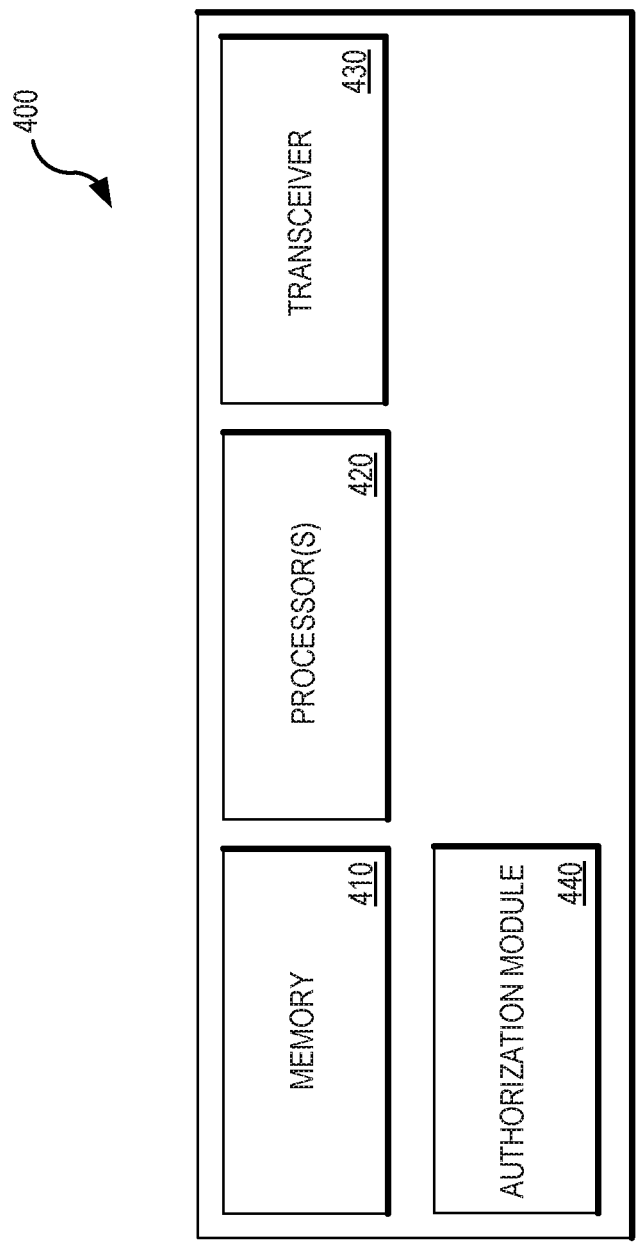
FIG. 4 shows a block diagram of an authorization server.

FIG. 4 shows a block diagram of an authorization server. The authorization server 400 includes at least one processor 420 and a memory 410 having instructions stored thereupon. The instructions upon execution by the processor 420 configure the authorization server 400 to perform the operations described for the authorization module 440 as described in FIGS. 2 and 6 and/or in the various embodiments in this patent document. The authorization server 400 includes a transceiver 430 that includes a receiver to receive protected data and transaction information from a POS device and a transmitter to send protected data to the personal information server and a message authorizing or unauthorizing the transaction to the POS device.

Figure 5:
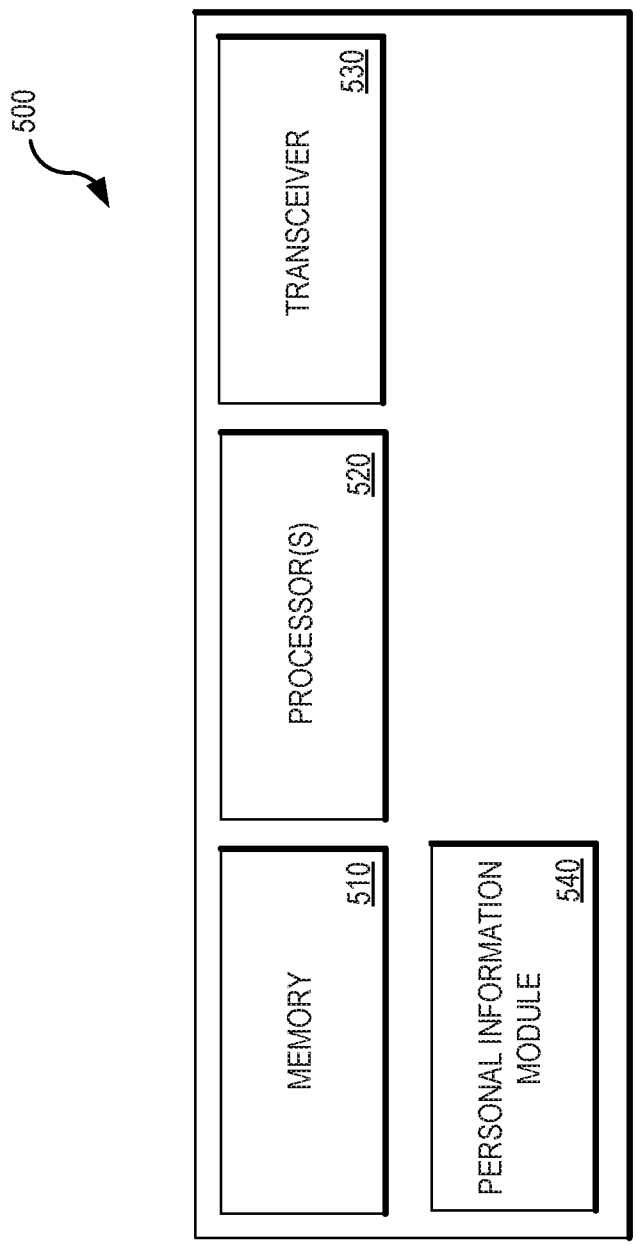
FIG. 5 shows a block diagram of a personal information server.

FIG. 5 shows a block diagram of a personal information server. The personal information server 500 includes at least one processor 520 and a memory 510 having instructions stored thereupon. The instructions upon execution by the processor 520 configure the personal information server 500 to perform the operations described for the personal information module 540 as described in FIGS. 2 and 6 and/or in the various embodiments in this patent document. The personal information server 500 includes a transceiver 530 that includes a receiver to receive protected data from the authorization server and a transmitter to send personal information determined from the protected data to the authorization server.

Figure 6:
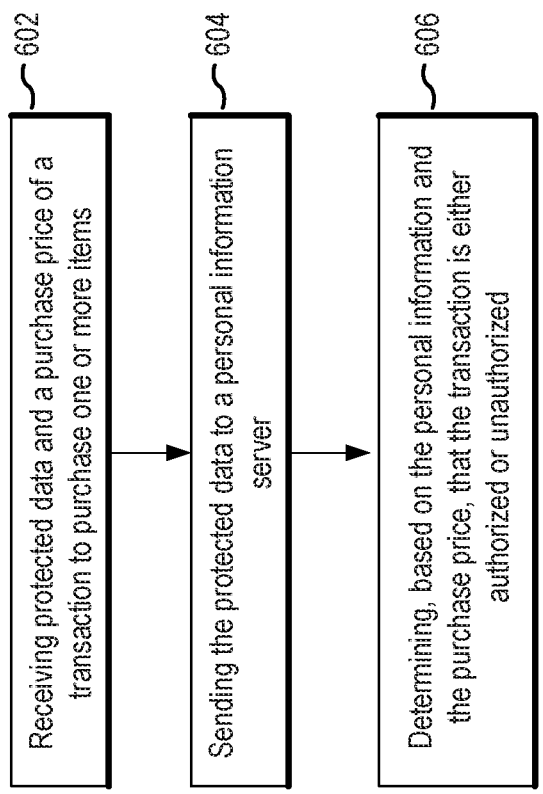
FIG. 6 shows for performing authorization of a transaction performed by an authorization server.

FIG. 6 shows for performing authorization of a transaction performed by an authorization server. At the receiving operation 602, the authorization module of the authorization server receives protected data and a purchase price of a transaction to purchase one or more items, where the protected data is based on a pre-determined value known to an electronic card. In some embodiments, the protected data is generated by the electronic card using the pre-determined value stored in a smart chip of the electronic card. In some embodiments, the electronic card selects the pre-determined value in an order from a list of pre-determined values stored in the smart chip, and the order of selection and the list of pre-determined values are known to the personal information server. In some embodiments, the electronic card selects the pre-determined value for each transaction for which the electronic card is used. In some embodiments, the personal information includes any one or more of a credit card number of the owner, a name of the owner, and an account number of the owner.

At the sending operation 604, the authorization module of the authorization server sends the protected data to a personal information server. The personal information module of the personal information server is configured to (1) determine, based on the protected data, personal information that identifies an owner of the electronic card, and (2) send the personal information to the authorization server.

At the determining operation 606, the authorization module of the authorization server determines, based on the personal information and the purchase price, that the transaction is either authorized or unauthorized. The authorization module may send a message to a point of sale (POS) device indicating that the transaction is either authorized or unauthorized. In some embodiments, the authorization module determines that the transaction is authorized by determining that the personal information is previously stored on a database associated with the authorization server, and by determining that the purchase price is less than or equal to a stored purchase price limit associated with the personal information.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An authorization system, comprising:
an electronic card configured to:
in response to power being received by the electronic card, generate protected data based on a first value and a pre-determined value that are both known to the electronic card,
wherein the protected data is an encrypted value,
wherein the first value excludes personal information that identifies an owner of the electronic card, and
wherein the pre-determined value includes an encryption key;
send the protected data to a point-of-sale (POS) device;
the POS device configured to:
receive the protected data from the electronic card; and
send the protected data and a purchase price of a transaction to purchase one or more items to an authorization server;
the authorization server configured to:
receive the protected data and the purchase price of the transaction;
send the protected data to a personal information server, wherein the personal information server is configured to:
(1) determine, based on the protected data, personal information that identifies the owner of the electronic card, wherein the personal information server is configured to identify a decryption key using at least some values of the protected data to obtain the personal information, and
(2) send the personal information to the authorization server; and
determine, based on the personal information and the purchase price, that the transaction is either authorized or unauthorized, wherein a message is sent to the POS device indicating that the transaction is either authorized or unauthorized.

2. The system of claim 1, wherein the transaction is determined to be authorized by the authorization server being configured to:
determine that the personal information is previously stored on a database associated with the authorization server; and
determine that the purchase price is less than or equal to a stored purchase price limit associated with the personal information.

3. The system of claim 1, wherein the protected data is generated by the electronic card using the pre-determined value stored in a smart chip of the electronic card.

4. The system of claim 3,
wherein the electronic card is configured to select the pre-determined value in an order from a list of pre-determined values stored in the smart chip, and
wherein the order of selection and the list of pre-determined values are known to the personal information server.

5. The system of claim 4, wherein the electronic card is configured to select the pre-determined value for each transaction for which the electronic card is used.

6. The system of claim 4, wherein the order to select the pre-determined value is an out-of-sequence order.

7. The system of claim 1, wherein the personal information includes any one or more of a credit card number of the owner, a name of the owner, and an account number of the owner.

8. The system of claim 1, wherein the personal information server and the authorization server are a same server.

9. The system of claim 1, wherein the first value is a randomly generated value known to the electronic card and the personal information server.

10. A method for performing authorization of a transaction performed by an authorization server, the method comprising:
receiving protected data and a purchase price of a transaction to purchase one or more items, wherein the protected data is based on a first value and a pre-determined value both known to an electronic card,
wherein the protected data is generated by the electronic card in response to power being received by the electronic card,
wherein the protected data is an encrypted value,
wherein the first value excludes personal information that identifies an owner of the electronic card, and
wherein the pre-determined value includes an encryption key;
sending the protected data to a personal information server to determine based on the protected data, personal information that identifies an owner of the electronic card, wherein a decryption key is identified using at least some values of the protected data to obtain the personal information;
receiving the personal information from the personal information server; and
determining, based on the personal information and the purchase price, that the transaction is either authorized or unauthorized, wherein a message is sent to a point of sale (POS) device indicating that the transaction is either authorized or unauthorized.

11. The method of claim 10, wherein the transaction is determined to be authorized by:
determining that the personal information is previously stored on a database associated with the authorization server; and
determining that the purchase price is less than or equal to a stored purchase price limit associated with the personal information.

12. The method of claim 10, wherein the protected data is generated by the electronic card using the pre-determined value stored in a smart chip of the electronic card.

13. The method of claim 12,
wherein the electronic card selects the pre-determined value in an order from a list of pre-determined values stored in the smart chip, and wherein the order of selection and the list of pre-determined values are known to the personal information server.

14. The method of claim 13, wherein the electronic card selects the pre-determined value for each transaction for which the electronic card is used.

15. The method of claim 13, wherein the order to select the pre-determined value is an out-of-sequence order.

16. The method of claim 10, wherein the personal information includes any one or more of a credit card number of the owner, a name of the owner, and an account number of the owner.

17. The method of claim 10, wherein the first value is a randomly generated value known to the electronic card and the personal information server.

18. A non-transitory computer readable program storage medium having code stored thereon, the code, when executed by a processor, causing the processor to implement a method comprising:
    receiving, by an authorization server, protected data and a purchase price of a transaction to purchase one or more items, wherein the protected data is based on a first value and a pre-determined value both known to an electronic card,
        wherein the protected data is generated by the electronic card in response to power being received by the electronic card,
        wherein the protected data is an encrypted value,
        wherein the first value excludes personal information that identifies an owner of the electronic card, and
        wherein the pre-determined value includes an encryption key;
    sending the protected data to a personal information to determine, based on the protected data, personal information that identifies an owner of the electronic card, wherein a decryption key is identified using at least some values of the protected data to obtain the personal information;
    receiving the personal information from the personal information server; and
    determining, based on the personal information and the purchase price, that the transaction is either authorized or unauthorized, wherein a message is sent to a point of sale (POS) device indicating that the transaction is either authorized or unauthorized.

19. The non-transitory computer readable program storage medium of claim 18, wherein the transaction is determined by:
    determining that the personal information is previously stored on a database associated with the authorization server; and
    determining that the purchase price is less than or equal to a stored purchase price limit associated with the personal information.

20. The non-transitory computer readable program storage medium of claim 18, wherein the protected data is generated by the electronic card using the pre-determined value stored in a smart chip of the electronic card.

21. The non-transitory computer readable program storage medium of claim 20,
    wherein the electronic card selects the pre-determined value in an order from a list of pre-determined values stored in the smart chip, and
    wherein the order of selection and the list of pre-determined values are known to the personal information server.

22. The non-transitory computer readable program storage medium of claim 21, wherein the electronic card selects the pre-determined value for each transaction for which the electronic card is used.

23. The system of non-transitory computer readable program storage medium 21, wherein the order to select the pre-determined value is an out-of-sequence order.

* * * * *